United States Patent
Jar et al.

(10) Patent No.: US 10,674,324 B2
(45) Date of Patent: Jun. 2, 2020

(54) INTERFACE FOR INTEGRATION OF RADIO SYSTEMS

(71) Applicant: Saudi Arabian Oil Company, Dhahran (SA)

(72) Inventors: Mustafa A. Jar, Dhahran (SA); Naif A. Daafas, Dhahran (SA); Mohammad S. Alkharafi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 16/127,484

(22) Filed: Sep. 11, 2018

(65) Prior Publication Data

US 2020/0084591 A1 Mar. 12, 2020

(51) Int. Cl.
*H04W 4/10* (2009.01)
*H04W 92/02* (2009.01)

(52) U.S. Cl.
CPC .............. *H04W 4/10* (2013.01); *H04W 92/02* (2013.01)

(58) Field of Classification Search
CPC ........ H04M 3/241; H04W 4/10; H04W 92/02
USPC ........ 455/519, 520, 517, 518, 452.1, 7, 11.1
See application file for complete search history.

(56) References Cited

U.S. PATENT DOCUMENTS

| | | | | |
|---|---|---|---|---|
| 5,787,364 A | * | 7/1998 | Exner | ...................... H04W 4/12 379/100.06 |
| 5,920,825 A | * | 7/1999 | Patel | ...................... H04W 76/20 455/557 |
| 2004/0013097 A1 | * | 1/2004 | Massa | ................. H04L 12/4604 370/335 |
| 2016/0227588 A1 | * | 8/2016 | Patel | ....................... H04W 4/08 |

OTHER PUBLICATIONS

International Search Report and Written Opinion issued in International Application No. PCT/US2019/050556 dated Nov. 7, 2019, 15 pages.
Amtelco, "Host Media Processing E&M Board Technical Manual," retrieved from URL <:https://xds.amtelco.com/sites/default/files/pdf s/boards/266niO01. pdf> retrieved on Oct. 28, 2019, published Feb. 19, 2013, 32 pages.
Andersen, "Soundcard interface (including PTT) for Baofeng UV5R and other cheap handhelds," retrieved from URL <https://k0rx.com/blog/2O17/11/baofeng.html> retrieved on Oct. 28, 2019, published on Nov. 1, 2017, 2 pages.

* cited by examiner

*Primary Examiner* — John J Lee
(74) *Attorney, Agent, or Firm* — Fish & Richardson P.C.

(57) ABSTRACT

Methods, systems, and universal interface to perform operations comprising initiating, at a first communication system, a call to a second communication system over a 4-wire E&M interface of the first communication system by adjusting, at the first communication system, a state of an e-lead of the first communication system to a closed state; in response to the initiating, triggering, at an interface board, a solid state relay to switch signaling from the first communication system to the second communication system; and in response to the triggering, establishing the call with the second communication system over an auxiliary audio interface of the second communication system.

20 Claims, 5 Drawing Sheets

INTERFACE FOR INTEGRATION OF RADIO SYSTEMS

TECHNICAL FIELD

This disclosure relates to an interface for the integration of communication systems (for example, radio systems), and specifically, between an auxiliary audio interface and a 4-Wire E&M Interface of respective communication systems.

BACKGROUND

Conventionally, to patch two communication systems, a 4-wire E&M interface was used on both communication systems. However, some communication systems do not implement or support 4-Wire E&M interfaces. For example, a first communication network can be used for critical communications; however, remote areas might not have support for an infrastructure for such a communication network to exist. As such, these remote areas may not be able to receive communications related to emergency situations and security concerns, or communicate back a status of conditions at such remote locations.

SUMMARY

The present disclosure discusses an interface board for integrating communication between two differing communication (radio) systems. The interface computing system can receive input from any communication system with an auxiliary audio interface and convert the required signals into a standard 4-wire E&M.

Innovative aspects of the subject matter described in this specification may be embodied in methods that include the actions of initiating, at a first communication system, a call to a second communication system over a 4-wire E&M interface of the first communication system by adjusting, at the first communication system, a state of an e-lead of the first communication system to a closed state; in response to the initiating, triggering, at an interface board, a solid state relay to switch signaling from the first communication system to the second communication system; and in response to the triggering, establishing the call with the second communication system over an auxiliary audio interface of the second communication system.

These and other embodiments may each optionally include one or more of the following features. For instance, in response to the initiating, adjusting, at the second communication system, a state of a push-to-talk parameter of the second communication system to a ground state. Matching an impedance, by the interface board, between the first communication system and the second communication system. The interface board is in communication with the first communication system over the 4-wire E&M interface, and is in communication with the second communication system over the auxiliary audio interface. The first communication system is a Terrestrial Trunked Radio (TETRA) system, and the second communication system is an Integrated Digital Enhanced Network (iDEN) system. Initiating, at the second communication system, an additional call to the first communication system over the auxiliary audio interface of the second communication system; in response to the initiating, matching, by the interface board, an impedance between the first communication system and the second communication system; and in response to the matching, establishing the additional call with the first communication system over the 4-wire E&M interface of the first communication system.

Particular implementations of the subject matter described in this specification can be implemented so as to realize one or more of the following advantages. For example, implementation of the subject matter provide integration of radio systems over the voice level that minimizes, or eliminates, any delay in the voice stream. Furthermore, integration on the voice level between an auxiliary connector and a 4-wire E&M makes the integration universal and applicable for any radio system with 4-wire E&M and/or auxiliary connector.

The details of one or more implementations of the subject matter described in this disclosure are set forth in the accompanying drawings and the description herein. Other features, aspects, and advantages of the subject matter will become apparent from the description, the drawings, and the claims.

DETAILED DESCRIPTION

Figure 1:
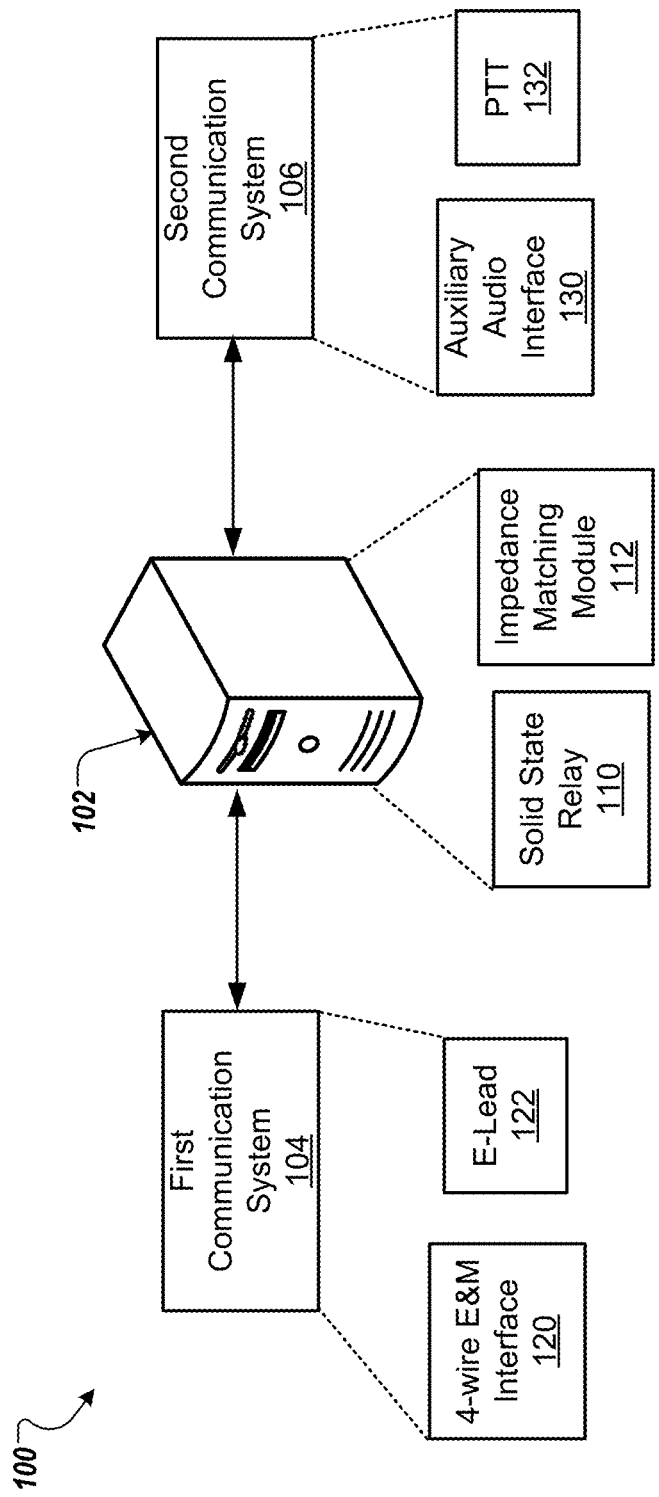
FIG. 1 is a schematic illustration of a system for interfacing between two communication systems.

The present disclosure describes a universal interface 100 for interfacing between two communication systems, shown in FIG. 1. The universal interface 100 includes an interface board 102, a first communication system 104, and a second communication system 106. The interface board 102 is in communication with the first communication system 104 and the second communications system 106 over one or more networks (not shown). The interface board 102 can include a solid state relay 110 and an impedance matching module 112. The first communication system 104 can include a 4-wire E&M interface 120 and an E-lead 122. The second communication system 106 can include an auxiliary audio interface 130 and a push-to-talk (PTT) module 132.

In short, the system 100 provides integration of the first communication system 104 with the second communication system 106. Specially, each of the communication systems 104, 106 can utilize differing system types. For example, the first communication system 104 can be based on a 4-wire E&M technology, while the second communication system 106 can include an auxiliary audio interface (and further, not include a 4-wire E&M interface). To that end, the system 100 can provide a communications interface between a 4-wire E&M interface and an auxiliary audio interface. In some examples, the communications interface between the 4-wire E&M interface 120 and the auxiliary audio interface 130 is over the voice level and independent of exchange of management data and communication protocols between the first communication system 104 and the second communication system 106. In some examples, the first communication system 104 is a Terrestrial Trunked Radio (TETRA) system, and the second communication system 106 is an Integrated Digital Enhanced Network (iDEN) system.

In short, the interface board 102 can i) match the impedance between the first communication system 104 and the second communication system 106, ii) perform audio coupling, and iii) convert PTT signals received from one of the communication systems 104, 106 to be compatible with the other of the communication systems 104, 106. In some examples, audio coupling between the first and the second communication devices 104, 106 is established without exchange of management data.

Figure 2:
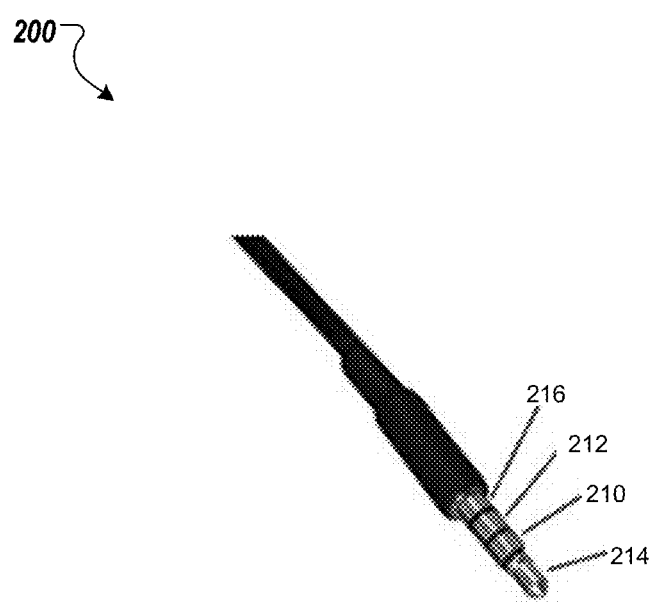
FIG. 2 illustrates an auxiliary audio interface.

Referring to FIG. 2, an auxiliary audio interface 202 is shown, similar to the auxiliary audio interface 130 of FIG. 1. The auxiliary audio interface 202 includes a first ring 210, a second ring 212, a tip 214, and a sleeve 216. To that end, the interface computing device 102 can interface with the second communication system 104 over the auxiliary audio interface 202. Specifically, the interface board 102 is in communication with the auxiliary audio interface 202 over signals—i) a speaker signal (input audio), ii) a microphone signal (output audio), and iii) a PTT signal. For example, the first ring 210 can be associated with the speaker signal, the tip 214 can be associated with the microphone signal, and the second ring 212 can be associated with the PTT signal.

Referring back to FIG. 1, the E-lead 122 of the first communication system 104 is a telecommunication signal that is used to exchange control signals between the first communication system 104 and the second communication system 106, described further herein. The solid state relay 110 in the interface board 102 is an electronic switch used for switching of signaling between the first communication system 104 and the second communication system 106. For example, a −48 volt (direct current) is used as a reference to trigger the solid state relay 110.

Figure 3:
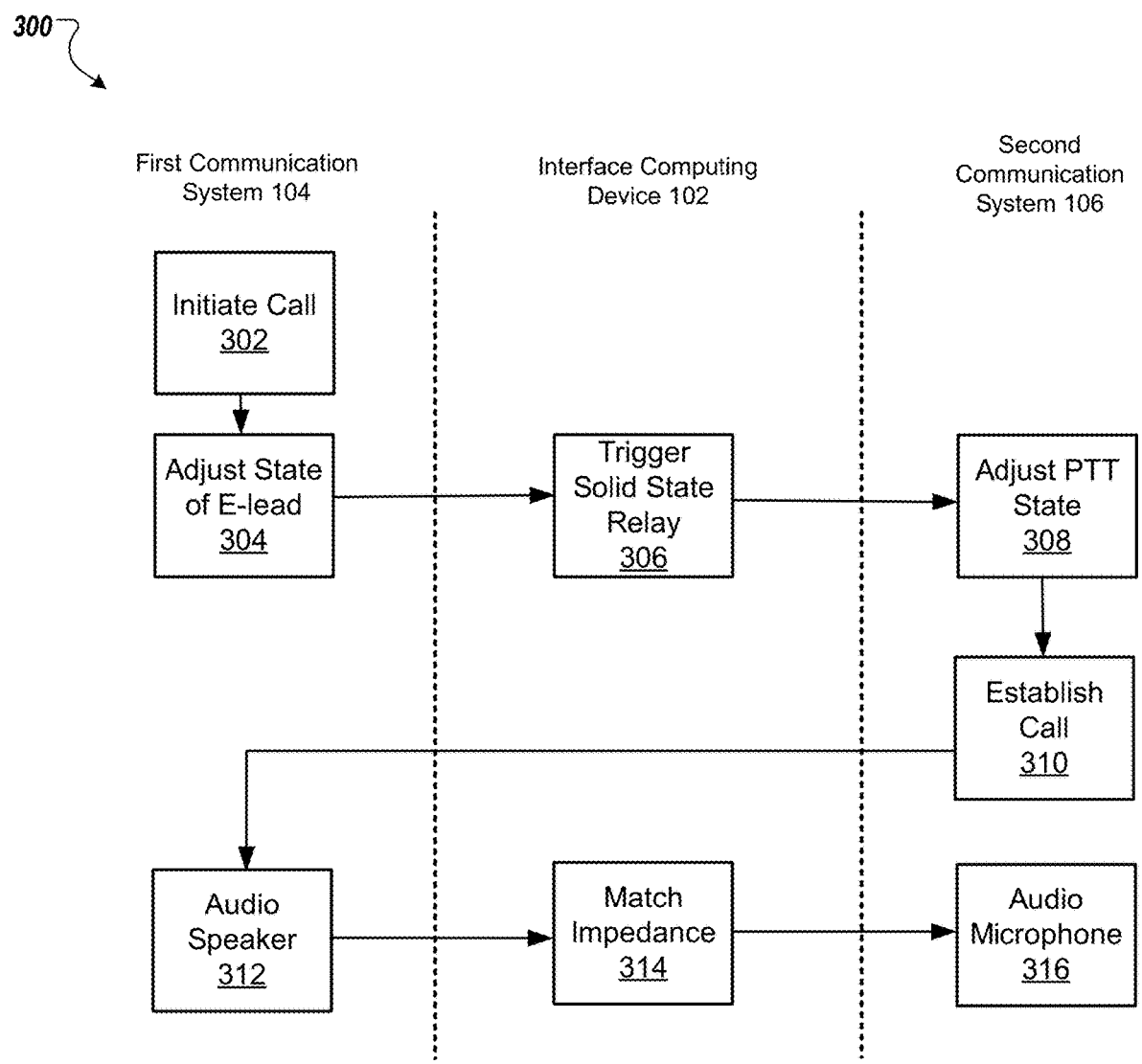
FIGS. 3 and 4 illustrate respective flowcharts for interfacing between two communication systems

Referring to FIG. 3, a flowchart 300 that illustrates a method for interfacing between two communication systems. For clarity of presentation, the description that follows generally describes method 300 in the context of FIGS. 1 and 2. For example, as illustrated, particular steps of the method 300 may be performed on or at the universal interface 100. However, method 300 may be performed, for example, by any other suitable system, environment, software, and hardware, or a combination of systems, environments, software, and hardware as appropriate. Operations of method 300 can include one or more optional steps, including only one or more of the steps being performed, and further, that the steps of FIG. 3 can be performed in any order.

The first communication system 104 initiates a call to the second communication system 106 (302). Specifically, the first communication system 104 initiates the call to the second communication system 106 over the 4-wire E&M interface 120 of the first communication system 104. In some examples, the first communication system 104 initiates the call to the second communication system 104 over the 4-wire E&M interface 120 by adjusting, at the first communication system 104, a state of the E-lead 122 to a closed state (304). For example, the interface board 102 is in communication with the first communication system 104 over the 4-wire E&M interface 120 and is in communication with the second communication system 106 over the auxiliary audio interface 130.

In response to the initiation of the call, the solid state relay 110 is triggered to switch signaling from the first communication system 104 to the second communication system 106 (306). Furthermore, in some examples, in response to the initiation of the call, the second communication system 106 adjusts a state of the PTT module 132 to a ground (short) state (308). In response to triggering the solid state relay 110, the second communication system 106 establishes the call with the first communication system 104 over the interface board 102 (310). Specifically, the second communication system 106 establishes the call with the first communication system 104 over the auxiliary audio interface 130. The second communication system 106 can provide signals to the first communication system 104, for example, signals to the audio speaker of the first communication system 104 (312).

The interface board 102, and specifically, the impedance matching module 112, can match an impedance between the first communication system 104 and the second communication system 106 (314). In some examples, the impedance between the first communication system 104 and the second communication system 106 is based on an impedance associated with the second communication system 106. In a first example, audio from an auxiliary microphone associated with the second communication system 106 can include a 10,000 Ohm impedance, and the impedance of an audio level of the first communication system 104 can be 600 Ohms. In a second example, audio associated with the first communication device 104 can be include a 600 Ohm impedance and auxiliary speaker audio levels associated with the first communication system 104 can be 80 Ohms. In both examples, the impedance matching module 112 can match the impedance between the differing impedance levels. The impedance matching module 112 matches impedance between the first communication system 104 and the second communication system 106 to maximize power transfer between the first communication system 104 and the second communication system 106. In some examples, the impedance matching module 112 can include a resistance arrangement that corresponds to the input impedance.

The interface board 102 provides an audio signal to the second communication device 106 (316). For example, to an audio microphone of the second communication device 106.

Figure 4:
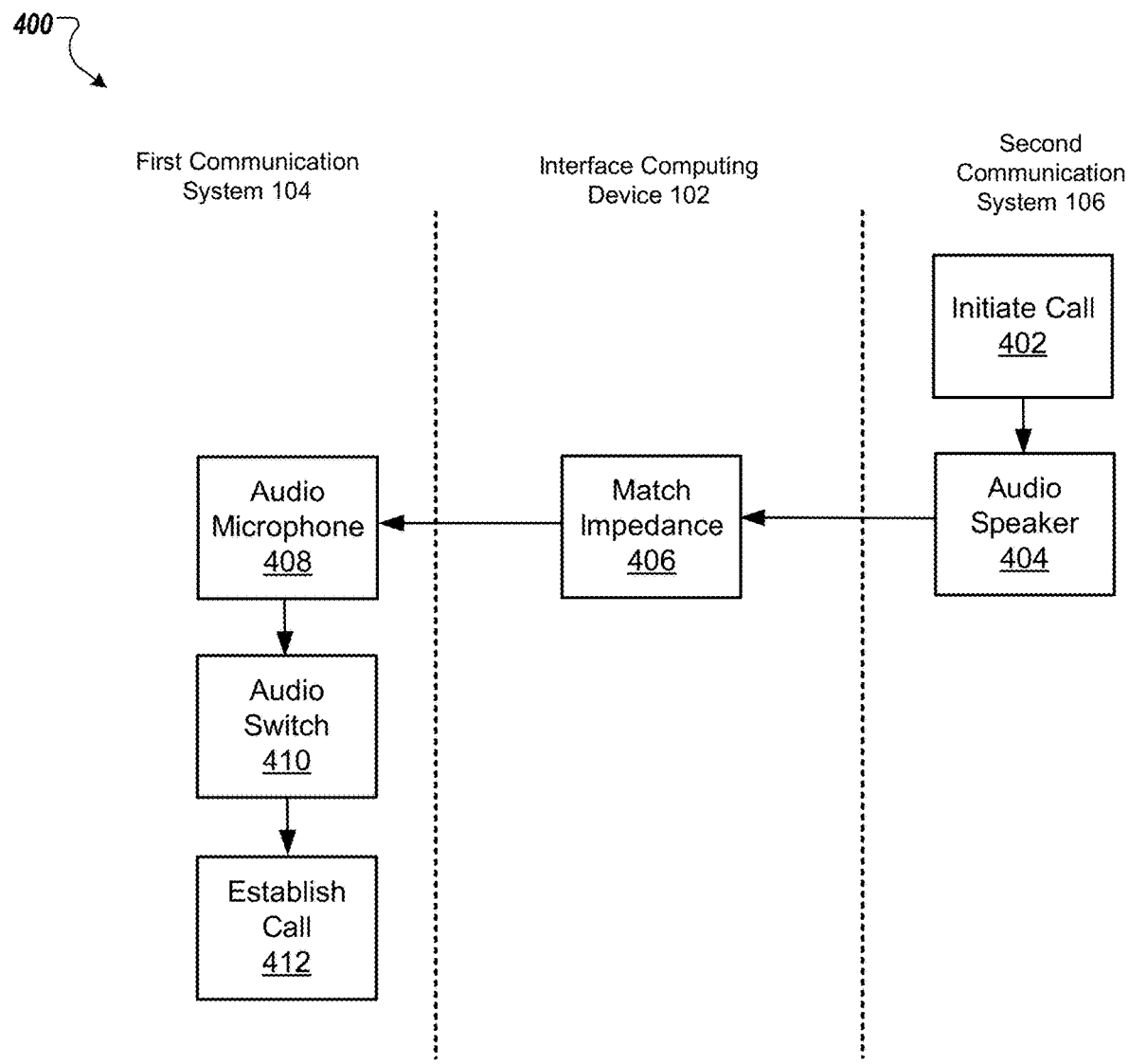

Referring to FIG. 4, a flowchart 400 that illustrates a method for interfacing between two communication systems. For clarity of presentation, the description that follows generally describes method 400 in the context of FIGS. 1 and 2. For example, as illustrated, particular steps of the method 400 may be performed on or at the universal interface 100. However, method 400 may be performed, for example, by any other suitable system, environment, software, and hardware, or a combination of systems, environments, software, and hardware as appropriate. Operations of method 400 can include one or more optional steps, including only one or more of the steps being performed, and further, that the steps of FIG. 4 can be performed in any order.

The second communication system 106 initiates a call to the first communication system 104 (402). Specifically, the second communication system 106 initiates the call to the first communication system 104 over the auxiliary audio interface 130 of the second communication system 106. In some examples, in response to initiating the call, the audio speaker of the second communication system 106 generates a signal to provide to the interface board 102 (404). Further, in response to initiating the call, the interface board 102 matches an impedance between the first communication system 104 and the second communication system 106 (406). For example, an impedance is adjusted from 800 Ohm to 600 Ohm to match with the audio levels of the first communication system 104. In response to the matching, the first communication device 102, and specifically an audio microphone of the first communication device 102, receives a signal from the interface board 102 (408). Audio is detected by a voice operated switch (410), and the first communication device 102 established the call over the 4-wire E&M interface 120 (412).

Figure 5:
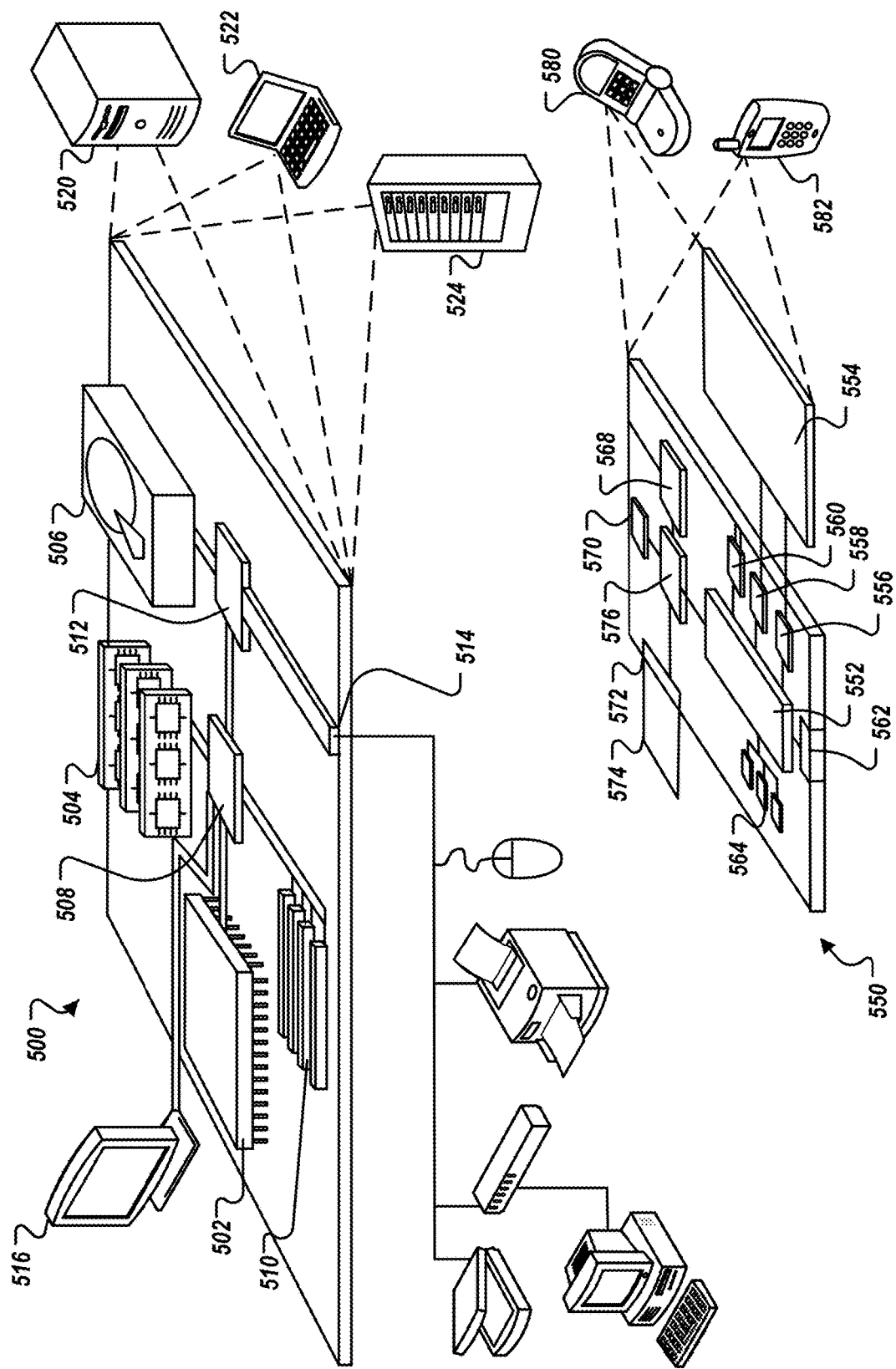
FIG. 5 illustrates an example computing environment for implementing the techniques described herein.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 may process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (for example, as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 504, the storage device 506, or a memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (for example, through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (for example, USB, Bluetooth, Ethernet, wireless Ethernet) may be coupled to one or more input/output devices, such as a keyboard, a pointing device, a scanner, or a networking device such as a switch or router, for example, through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 may execute instructions within the computing device 640, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 548 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 may be implemented as one or more of a computer-readable medium or media, a volatile memory unit or units, or a non-volatile memory unit or units. Expansion memory 554 may also be provided and connected to device 550 through expansion interface 552, which may include, for example, a SIMM (Single In Line Memory Module) card interface. Such expansion memory 554 may provide extra storage space for device 550, or may also store applications or other information for device 550. Specifically, expansion memory 554 may include instructions to carry out or supplement the processes described above, and may include secure information also. Thus, for example, expansion memory 554 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 554, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 550 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, for example, in a handset of device 550. Such sound may include sound from voice telephone calls, may include recorded sound (for example, voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here may be realized in digital circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (for example, magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (for example, a CRT (cathode ray tube) or LCD (liquid crystal display) monitor) for displaying information to the user and a keyboard and a pointing device (for example, a mouse or a trackball) by which the user may provide input to the computer. Other kinds of devices may be used to provide for interaction with a user as well; for example, feedback provided to the user may be any form of sensory feedback (for example, visual feedback, auditory feedback, or tactile feedback); and input from the user may be received in any form, including acoustic, speech, or tactile input.

The systems and techniques described here may be implemented in a computing system that includes a back end component (for example, as a data server), or that includes a middleware component (for example, an application server), or that includes a front end component (for example, a client computer having a graphical user interface or a Web browser through which a user may interact with an implementation of the systems and techniques described here), or any combination of such back end, middleware, or front end components. The components of the system may be interconnected by any form or medium of digital data communication (for example, a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A universal interface board, comprising:
   initiating, at a first communication system, a call to a second communication system over a 4-wire E&M interface of the first communication system by adjusting, at the first communication system, a state of an e-lead of the first communication system to a closed state;
   in response to the initiating, triggering, at the universal interface board, a solid state relay to switch signaling from the first communication system to the second communication system; and
   in response to the triggering, establishing the call with the second communication system over an auxiliary audio interface of the second communication system.

2. The universal interface board of claim 1, further comprising:
   in response to the initiating, adjusting, at the second communication system, a state of a push-to-talk parameter of the second communication system to a ground state.

3. The universal interface board of claim 1, further comprising:
   matching, by the interface computing device, an impedance between the first communication system and the second communication system.

4. The universal interface board of claim 3, wherein the impedance between the first communication system and the second communication system is based on an impedance associated with the second communication system.

5. The universal interface board of claim 1, wherein the universal interface board device is in communication with the first communication system over the 4-wire E&M interface, and is in communication with the second communication system over the auxiliary audio interface.

6. The universal interface board of claim 1, wherein the first communication system is a Terrestrial Trunked Radio (TETRA) system, and the second communication system is an Integrated Digital Enhanced Network (iDEN) system.

7. The universal interface board of claim 1, further comprising:
   initiating, at the second communication system, an additional call to the first communication system over the auxiliary audio interface of the second communication system;
   in response to the initiating, matching, by the universal interface board, an impedance between the first communication system and the second communication system; and
   in response to the matching, establishing the additional call with the first communication system over the 4-wire E&M interface of the first communication system.

8. A system, comprising:
   one or more processors; and
   a non-transitory computer-readable storage medium coupled to the one or more processors and storing programming instructions for execution by the one or more processors, the programming instructions instruct the one or more processors to perform operations comprising:
      initiating, at a first communication system, a call to a second communication system over a 4-wire E&M interface of the first communication system by adjusting, at the first communication system, a state of an e-lead of the first communication system to a closed state;
      in response to the initiating, triggering, at a universal interface board, a solid state relay to switch signaling from the first communication system to the second communication system; and
      in response to the triggering, establishing the call with the second communication system over an auxiliary audio interface of the second communication system.

9. The system of claim 8, the operations further comprising:
   in response to the initiating, adjusting, at the second communication system, a state of a push-to-talk parameter of the second communication system to a ground state.

10. The system of claim 8, the operations further comprising:
    matching, by the interface computing device, an impedance between the first communication system and the second communication system.

11. The system of claim 10, wherein the impedance between the first communication system and the second communication system is based on an impedance associated with the second communication system.

12. The system of claim 8, wherein the universal interface board is in communication with the first communication system over the 4-wire E&M interface, and is in communication with the second communication system over the auxiliary audio interface.

13. The system of claim 8, wherein the first communication system is a Terrestrial Trunked Radio (TETRA) system, and the second communication system is an Integrated Digital Enhanced Network (iDEN) system.

14. The system of claim 8, the operations further comprising:
    initiating, at the second communication system, an additional call to the first communication system over the auxiliary audio interface of the second communication system;
    in response to the initiating, matching, by the universal interface board, an impedance between the first communication system and the second communication system; and
    in response to the matching, establishing the additional call with the first communication system over the 4-wire E&M interface of the first communication system.

15. A non-transitory computer readable medium storing instructions to cause one or more processors to perform operations comprising:

initiating, at a first communication system, a call to a second communication system over a 4-wire E&M interface of the first communication system by adjusting, at the first communication system, a state of an e-lead of the first communication system to a closed state;

in response to the initiating, triggering, at a universal interface board, a solid state relay to switch signaling from the first communication system to the second communication system; and in response to the triggering, establishing the call with the second communication system over an auxiliary audio interface of the second communication system.

16. The non-transitory computer readable medium of claim 15, the operations further comprising:

in response to the initiating, adjusting, at the second communication system, a state of a push-to-talk parameter of the second communication system to a ground state.

17. The non-transitory computer readable medium of claim 15, the operations further comprising:

matching, by the interface computing device, an impedance between the first communication system and the second communication system.

18. The non-transitory computer readable medium of claim 17, wherein the impedance between the first communication system and the second communication system is based on an impedance associated with the second communication system.

19. The non-transitory computer readable medium of claim 15, wherein the universal interface board is in communication with the first communication system over the 4-wire E&M interface, and is in communication with the second communication system over the auxiliary audio interface.

20. The non-transitory computer readable medium of claim 15, wherein the first communication system is a Terrestrial Trunked Radio (TETRA) system, and the second communication system is an Integrated Digital Enhanced Network (iDEN) system.

* * * * *